Patented Apr. 18, 1933

1,904,414

UNITED STATES PATENT OFFICE

AUGUSTUS E. CRAVER, OF BROOKLYN, NEW YORK, ASSIGNOR TO THE BARRETT COMPANY, OF NEW YORK, N. Y., A CORPORATION OF NEW JERSEY

PRODUCTION OF AROMATIC ALDEHYDES

No Drawing. Original application filed November 18, 1921, Serial No. 516,124. Divided and this application filed July 23, 1927. Serial No. 208,063.

This invention relates to the production of aromatic aldehydes by catalytic oxidation in the vapor phase of the aliphatic side chain or side chains of aromatic hydrocarbons. It relates more specifically to the production of aromatic aldehydes from aromatic hydrocarbons characterized by the presence of at least one benzene nucleus, and in which aromatic hydrocarbon at least two hydrogen atoms have been substituted by other groups or elements, at least one of which is the element chlorine and at least one other of which is an aliphatic group that may be oxidized to an aldehydic group, as for instance the production of ortho-chlorbenzaldehyde from ortho-chlortoluene. This application is a division of my application No. 516,124 filed November 18, 1921, patented July 26, 1927, Patent No. 1,636,855.

The ordinary procedures for the production of aromatic aldehydes have been through the chlorination of the side chains and the subsequent hydrolysis of the chlorinated products, by oxidation of the side chains by wet oxidation methods, by modifications of Gatterman's synthesis through carbon monoxide and hydrochloric acid or hydrocyanic acid and hydrochloric acid. I am aware of U. S. Patent No. 1,284,887, which claims the vapor phase oxidation of side chains by oxides of vanadium. The following description of my process will make clear the improvements of my invention over the previous processes.

I have discovered that metallic oxides differ very widely in their catalytic action at elevated temperatures on the aliphatic substituents of aromatic hydrocarbons and also on the aromatic nucleus itself. For instance, I have found that if chlorinated aromatic hydrocarbons containing aliphatic substituents are subjected to catalysis by the use of different catalysts in the fifth and sixth groups of the periodic system, a marked difference of results will be obtained when using vanadium oxide as compared to other metals of the fifth and sixth groups. As an example, if a mixture of ortho-chlortoluene vapor and air be passed over a vanadium oxide catalyst, ortho-chlorbenzoic acid, ortho-chlorbenzaldehyde and maleic acid result, along with an accompanying measurable amount of the products of complete combustion, these products being in the proportions of 1.2 : 2.17 : 1.0 : 1.6 respectively, while if tantalum oxide is used as the catalyst in lieu of vanadium oxide, only ortho-chlorbenzaldehyde is obtained and this in a relatively much greater yield. The production of acid was found to be negligible as were also the products of complete combustion. Hydrochloric acid was, of course, produced in all cases in almost theoretical conformity with the products formed. Similarly oxides of other metals of the fifth and sixth groups (except vanadium) may be used in lieu of vanadium oxide to exert their aldehyde forming tendency upon ortho-chlortoluene. A comparison of results to be obtained by the use of the above specifically named catalysts as well as many others in the fifth and sixth groups when utilized in the oxidation of various other hydrocarbons is set forth in detail in my above named application.

This comparison of the catalytic action of oxides of the fifth and sixth groups on various aromatic hydrocarbons which are typified by a benzene nucleus, in which aromatic hydrocarbons aliphatic side chains are substituted, indicates a vast difference between vanadium oxide and the other oxides of the fifth and sixth groups. It is seen that such oxides as those of uranium, tungsten and tantalum exert their catalyzing influence practically entirely in the direction of aldehyde formation, involving only the aliphatic side chain, and it is to be likewise pointed out that if a plurality of aliphatic side chains are present, only one of the groups undergoes selective oxidation to the aldehyde, the production of the di- or tri-aldehydes being nil. On the other hand, vanadium oxide is characterized by its ability to carry the selective oxidation of the aliphatic side chain beyond the aldehydic group and even to disrupt the aromatic nucleus itself, forming partial oxidation products from the latter. For example, if there are two aliphatic groups, ortho to each other, in the same benzene nucleus the oxidation with vanadium oxide produces an aromatic ortho-dicarboxylic acid rather than stopping at the intermediate production of an aromatic ortho substituted monocarboxylic acid, while if the aliphatic groups occupy the meta or para positions to each other the oxidation, as far as the side chains are concerned, stops at the corresponding aromatic substituted acids. Of course, some aldehyde is produced in all cases with vanadium oxide, but this is relatively quite small when compared with the acid formation.

It is very obvious from the preceding description that the oxides of the fifth and sixth groups other than vanadium oxide are practically exclusively aldehyde-forming catalysts, while vanadium oxide is more of an acid-forming catalyst. It has been found that these aldehyde-forming oxides do not give the same percentage yields, but the important phenomenon is that they are essentially aldehyde-forming catalysts which differentiate them from vanadium oxide.

In carrying out this invention the hydrocarbon is vaporized in any convenient way and is mixed in suitable proportions with an oxygen-containing gas. For this purpose air may be used, or pure oxygen, or ozone, or a mixture of any or all of these, or other gases which contain free oxygen together with a certain amount of blanketing or diluent gases or steam, in order to facilitate the control of the rapidity or completeness of the oxidation, may be beneficially employed. It is desirable that the hydrocarbon vapors should be mixed with an amount of oxygen-containing gas at least sufficient to satisfy the theoretical requirement for aldehyde formation.

The catalysts may be prepared by depositing a salt of the metal or other water soluble compound of the metal on a suitable carrier, such as pumice, asbestos, etc., and igniting the deposited material to the oxide of the metal.

The previously described mixture of hydrocarbon vapor and oxygen-containing gas is then passed through the catalyst, which is preferably introduced into tubes or containers. The reaction is found to take place most satisfactorily at temperatures ranging between 300° and 700° C., which temperature is dependent, however, on the hydrocarbon in question, the speed of the hydrocarbon-gas mixture through the catalyst, namely the length of time a molecule of the gas is permitted to remain in contact with the catalytic zone, the ratio of hydrocarbon vapor to oxygen-containing gas, and also on the particular catalyst employed.

After the products of reaction have passed out of the reaction zone, the condensable portions of the same are condensed and separated in the usual manner for the recovery of the aldehyde, while the uncondensed gases may be permitted to escape. Any unchanged hydrocarbon may be again passed through the reaction zone, such hydrocarbon having been enriched with oxygen-containing gas when necessary before recirculating it through the reaction zone.

Although I do not intend to be limited to any specific proportions for carrying out my invention, the following is given as an example thereof. A mixture of air and ortho-chlortoluene vapor in the proporton of 6.3 parts of air to 1.0 part of ortho-chlortoluene by weight may be passed through a tantalum oxide catalyst at 500° C. at a speed equivalent to a time of contact of about 0.31 second. A yield of ortho-chlorbenzaldehyde of approximately 63% will be obtained with only an extremely small amount of maleic acid and no ortho-chlorbenzoic acid.

I claim:

1. The process of producing an aldehyde which comprises passing, in the vapor phase, ortho-chlortoluene and an oxygen-containing gas into contact with tantalum oxide, at a temperature of approximately 500° C.

2. The process of producing an aldehyde which comprises passing, in the vapor phase, ortho-chlortoluene and an oxygen-containing gas into contact with a metallic oxide, other than vanadium oxide, of the fifth and sixth periodic groups, and maintaining said contact for about 0.31 second at a temperature of approximately 550° C.

3. The process of producing an alydehyde which comprises passing, in the vapor phase, ortho-chlortoluene and an oxygen-containing gas into contact with tantalum oxide, and maintaining said contact for about 0.31 second at a temperature of approximately 550° C.

4. The process of producing an aromatic aldehyde which comprises passing, in the vapor phase, a benzene derivative containing a methyl group, and a chlorine atom, both attached directly to the benzene nucleus, and an oxygen-containing gas into contact with tantalum oxide.

5. The process of producing an aldehyde which comprises passing, in the vapor phase, ortho-chlortoluene and an oxygen-containing gas into contact with tantalum oxide.

In testimony whereof I affix my signature.

AUGUSTUS E. CRAVER.